July 14, 1925.
J. FOURNIA
1,545,751
SAFETY VEHICLE CONTROL SYSTEM
Filed June 24, 1919
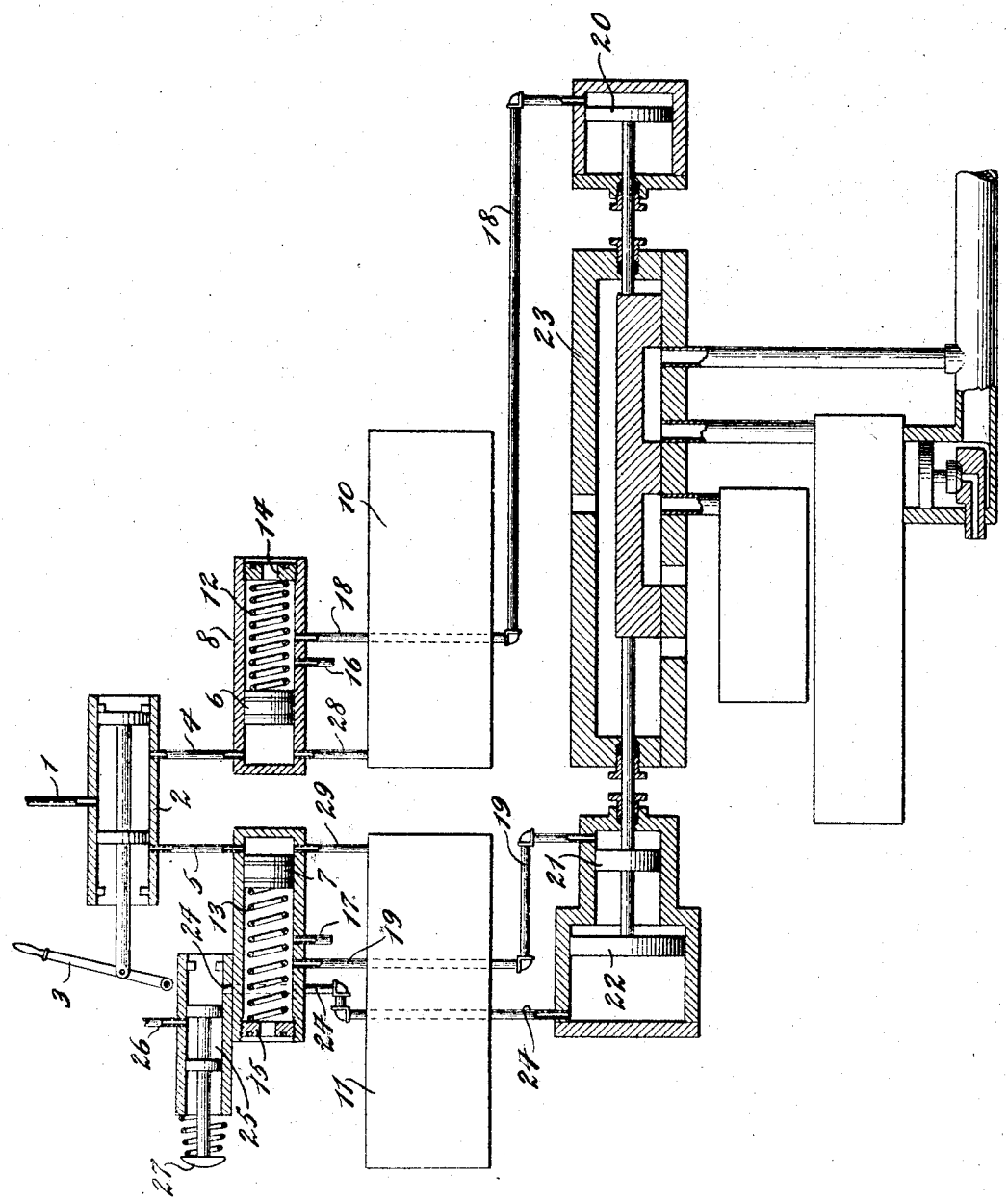
WITNESS:
INVENTOR.
John Fournia
BY
Rosenhaum, Stockridge & Borst
ATTORNEYS.

Patented July 14, 1925.

1,545,751

UNITED STATES PATENT OFFICE.

JOHN FOURNIA, OF CROTON-ON-HUDSON, NEW YORK.

SAFETY VEHICLE CONTROL SYSTEM.

Application filed June 24, 1919. Serial No. 306,345.

*To all whom it may concern:*

Be it known that I, JOHN FOURNIA, a citizen of the United States, residing at Croton-on-Hudson, in the county of Westchester and State of New York, have invented certain new and useful Improvements in Safety Vehicle Control Systems, of which the following is a full, clear, and exact description.

My invention relates to automatic train stop devices and has for an object to keep the driver of a locomotive continually on the alert and avoid his relaxing into a mental condition which is incompatible with the requisite degree of caution and ability to properly observe and interpret the signals and other conditions under his observation. A characteristic of my invention is the fact that it necessitates frequent positive acts on the part of the engine driver to keep the train going, and the likelihood of his becoming careless is thereby minimized.

In accordance with my invention I provide a device which has a tendency to apply the brakes and which will unless prevented apply the brakes within a predetermined time. The device is capable of being reset to initial condition and the engineer, in order to avoid having his train stopped, is obliged to perform the reset operation within each predetermined time interval. Preferably a warning signal will be given just prior to the operation of the device to apply the brakes. My device also acts as a safety device to stop the train in the event of an accident to the engineer.

In the preferred embodiment of my invention I provide means operative within a predetermined time to open communication between the brake valve and a source of fluid pressure, such as the main reservoir. Many forms of devices which will so function will readily suggest themselves but for the purpose of illustration I have selected a mechanism which I have found to be satisfactory. In this form the opening means for the conduit supplying air pressure to the brake valve are themselves air operated and are designed to operate within the predetermined time after air pressure is admitted to them. The brake valve has a double connection with the main reservoir or other source of air pressure, either one of which when opened will operate the brake valve, and opening means are provided in each connection which are alternately connected to a source of air pressure through a valve under the engineer's control.

In the accompanying drawing the figure is a diagrammatic representation, partly in section, of a construction embodying the improvement.

In the construction shown in the drawing, a conduit 1 connects with the pressure line from the main reservoir of the usual air brake system. This conduit also opens into the chamber of a valve 2, which is actuated by the hand lever 3 mounted at a convenient place on the vehicle. The valve 2 is connected with two other conduits 4 and 5. In the position shown in the drawing the valve chamber is open into the conduit 4, the valve is in one extreme position, and the conduit 5 is vented to the atmosphere. It is clear that upon the movement of lever 3 to the other extreme position, the relationship of the conduits to the valve will be reversed. Although the valve-actuating means is usually manual, in its limited sense, this term is used herein to embrace all means requiring a positive act of the operator.

The conduit 4 is connected with the chamber of a second valve 8 in which a piston 6 is fitted for reciprocatory movement. This valve has a second conduit 28 connecting it with an air chamber 10. This chamber may also be connected directly with the conduit 4. In the positions shown in the drawing the following condition may be assumed: From the conduit 1 the main air pressure has been introduced through the valve 2 and the conduits 4 and 28 into the chamber 10. A predetermined time for instance, ten seconds, is required for the chamber 10 to fill up so that the pressure on the piston 6 will overcome the compression spring 12 and cause the piston 6 to move to the right, first uncovering the port 16 and sounding a warning signal, and then, unless the lever 3 is meanwhile reversed, uncovering the opening to the conduit 18 which then transmits the main line pressure to the chamber of a piston head 20 adapted to actuate the brake-valve 23, the construction and operation of which is similar to that disclosed in my prior Patent #1,177,941, patented April 4, 1916. The tension of the spring 12 may be adjusted by adjusting the nut 14.

Similar mechanism similarly operative is connected with the conduit 5. When the position of the lever 3 is reversed, conduit 4 is vented to the atmosphere and pressure on the piston thereby released. When the conduit 5 is connected with the main pressure line, it transmits the air to the chamber 11 through the conduit 29, and when the air pressure in said chamber reaches a predetermined maximum, the piston 7 is pressed back against the compression spring 13, the tension of which is susceptible of adjustment by a nut 15, and exposes first a pipe to a warning whistle 17 before opening the conduit 19 which connects the main line pressure with the piston head 21.

It is apparent that the actuating mechanism is always operative at the predetermined intervals depending upon the time required for the pressure in the chambers 10 or 11 to reach a predetermined maximum, because one or the other of conduits 4 or 5 is always connected with the main line pressure.

It is apparent that the valve lever 3 must be reciprocated by the operator to prevent the application of the brakes, whenever the warning whistle is given, in the construction disclosed.

Any desired time may be chosen for the interval, but from the experience of applicant a ten-second interval for fast trains would be best to insure that the operator be kept on the alert.

If the brakes are applied they may be released by the operating the handle 27, which is normally in extended position and controls a valve. A conduit 26 connects with the brake cylinder, and when the valve chamber 25 opens to a conduit 24 the brake cylinder pressure is transmitted to piston head 22, which is of a size sufficient to overcome the pressure on head 20 or 21 and reset the brake valve.

While the invention has been described herein with great particularity of detail, yet, it will be readily understood that in carrying out the construction of the same, changes, within the scope of the appended claims, may be made, without departing from the spirit of the invention.

1. A claim:

1. In a safety vehicle control system in combination with a system of conduits on vehicle containing a source of energy and connected with a signal apparatus and brake applying apparatus to actuate the same and automatic means so arranged in conduits to delay the actuation of the signal and brake applying apparatus to a predetermined time. Manually controlled means so arranged in conduits to delay the actuation of the brake applying device.

2. In a safety vehicle control brake applying mechanism for the vehicle including a train pipe and source of pressure fluid a brake applying valve mechanism controlled by the pressure fluid and operative to reduce the pressure in the train pipe and operating valve arranged to admit pressure fluid to the brake applying valve mechanism to operate the same. A source of energy in a system of conduits connected to operating valve automatic means so arranged in conduit to retard the actuation of the brake applying valve mechanism to a predetermined time and manual control means arranged in conduit to delay the actuation of the brake applying valve mechanism.

3. In a railway vehicle, in combination with a brake-valve, actuating means adapted to be operated by pressure fluid within a predetermined interval and cause the brake-valve to be actuated and apply the brakes and adapted to be reset to initial position, means for delivering pressure fluid to the actuating means, and manually controlled means for resetting the actuating means.

4. In combination with a railway brake valve and a normally closed conduit thereto communicating with the main reservoir, controlling means comprising a valve operated by fluid pressure to open said conduit, and manually controlled means for resetting the controlling means to the initial position.

5. In combination with a railway brake valve and a normally closed conduit thereto communicating with the main reservoir, controlling means comprising a valve operated by fluid pressure to open said conduit, means in advance of said valve for gradually building up the fluid pressure to operative value, and manually controlled means for resetting the controlling means to the initial position.

6. In combination with a railway brake valve and a normally closed conduit thereto communicating with the main reservoir, controlling means comprising a valve operated by fluid pressure to open said conduit, a chamber in advance of the valve of such capacity that the operative pressure on said valve is attained within a predetermined time, and manually controlled means for resetting the controlling means to the initial position.

7. In combination with a railway brake valve adapted to be operated by fluid pressure, two conduits communicating with the brake valve, a source of fluid pressure, a manually controlled valve arranged to connect the two conduits alternately with the source of pressure fluid, and a pressure-operated valve in each conduit operative to open its conduit within a predetermined time after communication is established with the source of pressure fluid.

8. In combination with a railway brake valve adapted to be operated by fluid pressure, two conduits communicating with the brake valve, a source of fluid pressure, a manually controlled valve arranged to connect the two conduits alternately with the source of pressure fluid, a pressure-operated valve in each conduit operative to open its conduit when subjected to a predetermined pressure, and a chamber in advance of the pressure-operated valve having a capacity such that the operative pressure is attained within a predetermined time.

In witness whereof, I subscribe my signature.

JOHN FOURNIA.